Patented Oct. 31, 1922.

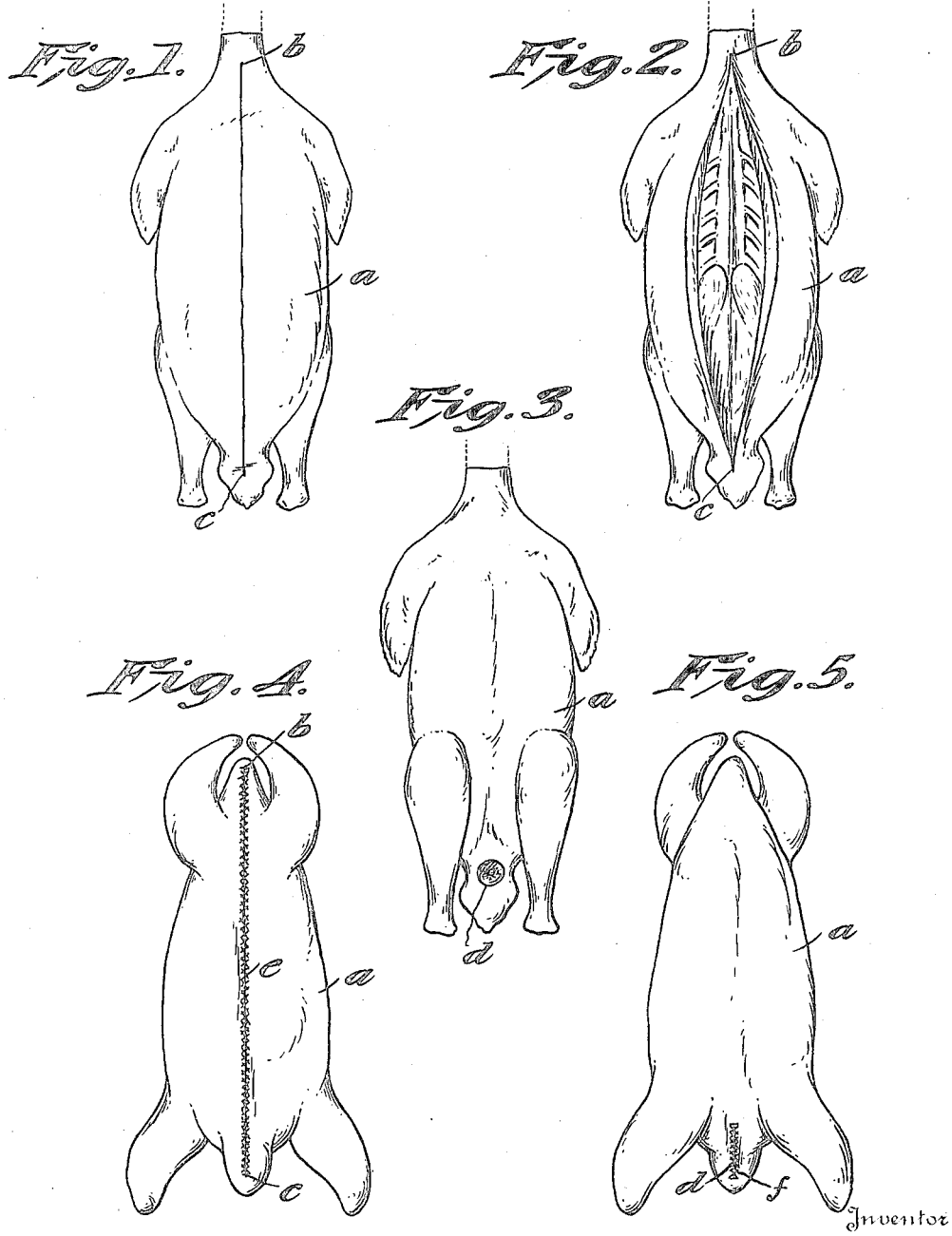

1,433,628

UNITED STATES PATENT OFFICE.

HENRY E. KNAUST, OF ST. LOUIS, MISSOURI.

METHOD OF PREPARING CHICKENS AND OTHER EDIBLE FOWL FOR COOKING AND EATING.

Application filed October 20, 1919. Serial No. 331,932.

*To all whom it may concern:*

Be it known that I, HENRY E. KNAUST, a citizen of the United States, residing at the city of St. Louis, State of Missouri, have invented a certain new and useful Method of Preparing Chickens and other Edible Fowl for Cooking and Eating, of which the following is a specification.

This invention relates to a certain new and useful method of preparing chickens and other edible fowls for sale in market and by dealers whereby the cooking, carving and eating of the foul is much more readily and easily accomplished than has been possible with fowl as they have heretofore been furnished and served.

The principal object of my present invention is to prepare the fowl in such manner that the meat of the fowl, as a single connected piece or whole, is freed from the bones, whereby the fowl, with the major portion of its meat intact, may be more thoroughly, uniformly, and rapidly cooked and its carving service and eating at the table more easily and conveniently performed and accomplished.

In the accompanying drawings, illustrating the invention, in the several figures of which like parts are similarly designated, Figure 1 is a back view of a picked fowl showing the initial cut in carrying out the invention. Fig. 2 is a back view showing the cut of Fig. 1 opened and the flesh of the back partly removed from the bones. Fig. 3 is a front view of the fowl showing the cut about the anus. Figs. 4 and 5 are a back and front view, respectively, of the fowl after the bones have been removed therefrom and prepared for cooking.

According to, and in practicing, my method, I take a chicken or other edible fowl *a* devoid of its feathers, that is to say, killed and picked, and with a sharp knife or other suitable implement, cut the skin along a definite line, preferably the median line of the back from the neck to a point near the anus as indicated by the line *b—c*, Fig. 1, where I deviate from the median line and make a substantially circular cut around the anus as shown at *d*, Fig. 3. Then, commencing at the center line of the back, and with a sharp knife or other suitable implement, I first separate the meat from the back bone and ribs as shown in Fig. 2, continuing the operation until the wings and legs are met, when I disconnect the wing and leg bones from the body bone. Then, further continuing the operation, I then further separate the meat, intact or as a single connected piece, in turn, from the sternum, or breast-bone, including its rib-bearing portion, thus entirely freeing the skeleton of the flesh. I then, with the meat still intact or as a single connected whole, free or separate the meat from the furcula, or wish-bone, thereby permitting the bodily removal of the furcula, which is discarded. The skeleton or the body bones proper being thus separated and freed from the meat of the fowl, and the wing and leg bones having been disconnected, I now easily lift out the skeleton of the body proper, with the entrails substantially untouched, and discard the same. Then, continuing the operation and manipulation of the knife, and with the meat still intact, I separate or free the meat from the radius and from the humerus, or first bones of the wings, after which I disconnect and discard the digits or distal joints and bones of the wings, and approximately at the same time bodily remove and discard the first bones of the wing. The operation being further continued, the meat, still intact or as a single connected whole, is separated and freed from the femurs or proximal bones of the legs, the said bones removed and discarded, and the second joints and bones of the legs also disconnected or separated and discarded. The meat is then freed from the neck to a desired length, where I decapitate.

The desirable portion of the meat of the fowl is thus entirely freed from the bones, and the meat of the fowl, so freed from the bones, and in a single connected piece or whole, is now ready for cooking.

For frying or broiling, it is obvious that the whole fowl as prepared, may be flattened out and its whole area subjected to substantially uniform treatment in the cooking, the carving at the table of the fowl so prepared being a pleasurable and easily accomplished act and the eating of the fowl being most convenient.

For stuffed and roasted fowl, the stuffing is placed within the meat and the meat sewed along the cuts *b—c* and *d*, as shown at *e* and *f* respectively in Figs. 4 and 5 in a common manner to retain the stuffing during the roasting, the later carving of the fowl being facilitated, due to the absence of all bones.

By the method herein described, turkeys, chickens and other edible fowl may be prepared in quantities in a practically intact and boneless condition, and placed upon the market or with dealers, and their customers or the trade furnished with an article of this sort, which will be much more readily and easily and thoroughly cooked, carved, served and eaten, than has been possible with fowl of this sort as they have heretofore been furnished with the bones therein.

I am aware that variations or modifications in the practice and employment of my method may be made and substituted for the steps herein described without departing from the nature and principle of my invention.

Having thus described my invention, what I claim and desire to secure by Letters Patent is:

1. The method of preparing picked edible fowls for cooking and eating, which consists in cutting the skin and flesh of the back along a single definite substantially straight median line from the neck to near the anus and separating and freeing the meat intact and as a single connected whole from the bones, and removing through said single cut the bones from the freed meat.

2. The method of preparing picked edible fowls for cooking and eating, which consists in cutting the skin and flesh of the back along a single definite substantially straight median line from the neck to near the anus, and separating and freeing the meat intact and as a single connected whole from the body bones proper and from the first leg and wing bones, then disconnecting and removing the distal joints and bones of the legs and wings, and then removing through said single cut the skeleton or body bones proper as a whole and the first bones of the legs and wings from the freed meat.

3. The method of preparing picked edible fowls for cooking and eating, which consists in cutting the skin and flesh of the back along a single median substantially straight line from the neck to about and then around the anus, and separating and freeing the meat intact and as a single connected whole from the body bones proper and from the first leg and wing bones, then disconnecting and removing the distal joints and bones of the legs and wings, then decapitating and discarding the neck and head, and then bodily removing through said single cut the skeleton or body bones proper as a whole with the entrails intact and the first bones of the legs and wings from the freed meat.

In testimony whereof, I have signed my name to this specification.

HENRY E. KNAUST.